Figure 1:
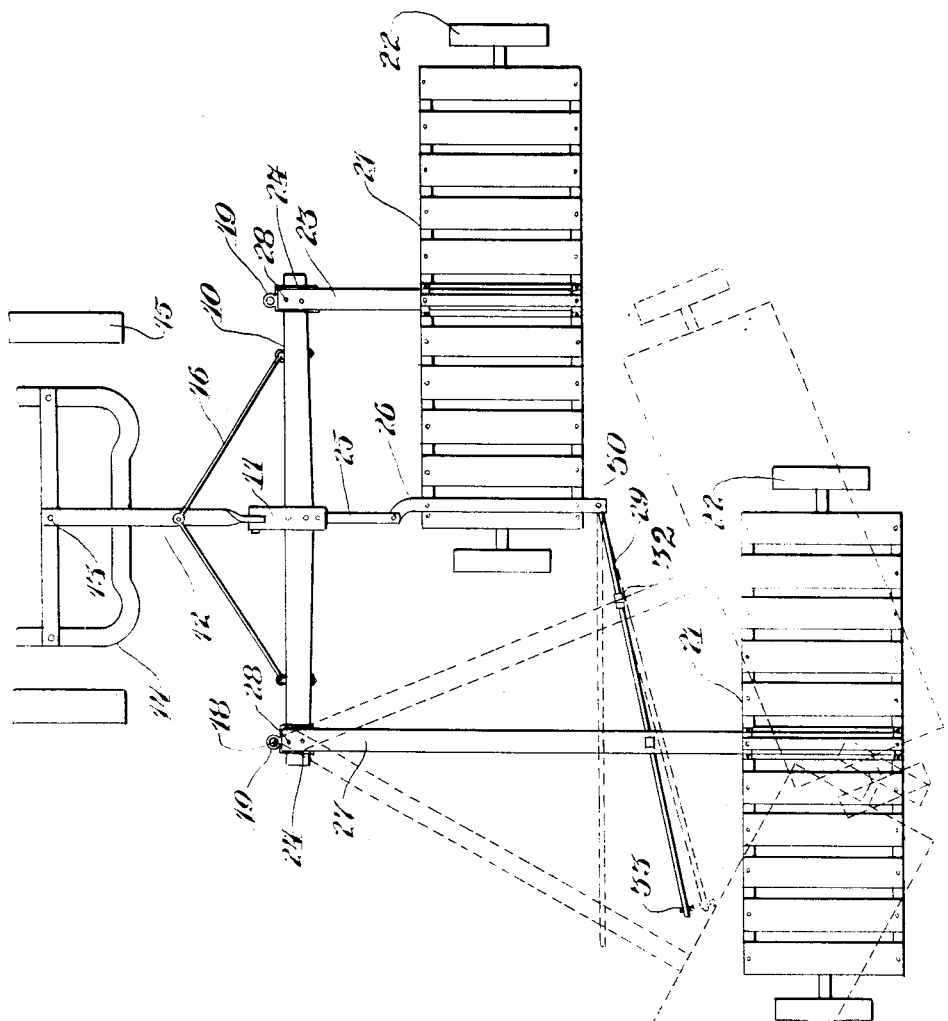

July 23, 1929.  W. S. GRAHAM  1,721,694
IMPLEMENT HITCH
Filed Jan. 24, 1927  2 Sheets-Sheet 1

Inventor
William S. Graham
By [signature]
Atty.

July 23, 1929.  W. S. GRAHAM  1,721,694
IMPLEMENT HITCH
Filed Jan. 24, 1927   2 Sheets-Sheet 2

Inventor
William S. Graham
By H. P. Doolittle
Atty.

Patented July 23, 1929.

1,721,694

UNITED STATES PATENT OFFICE.

WILLIAM S. GRAHAM, OF CANTON, ILLINOIS, ASSIGNOR TO INTERNATIONAL HARVESTER COMPANY, A CORPORATION OF NEW JERSEY.

IMPLEMENT HITCH.

Application filed January 24, 1927. Serial No. 162,981.

This invention relates to implements adapted for operation with tractors and particularly to a multiple implement assembly and draft means therefor.

The main object of the invention is to provide an arrangement of implement frame units and draft means that will permit short turns to be made when the assembly is being pulled by a tractor without occurrence of side drag and without fouling or interference between the several implement units.

Another object is to provide an arrangement of implement units that will permit operation over uneven ground and one in which the several units travel in parallel adjacent paths.

Other minor objects and advantages will become apparent as the description of the structure comprising the invention proceeds.

Figure 2:
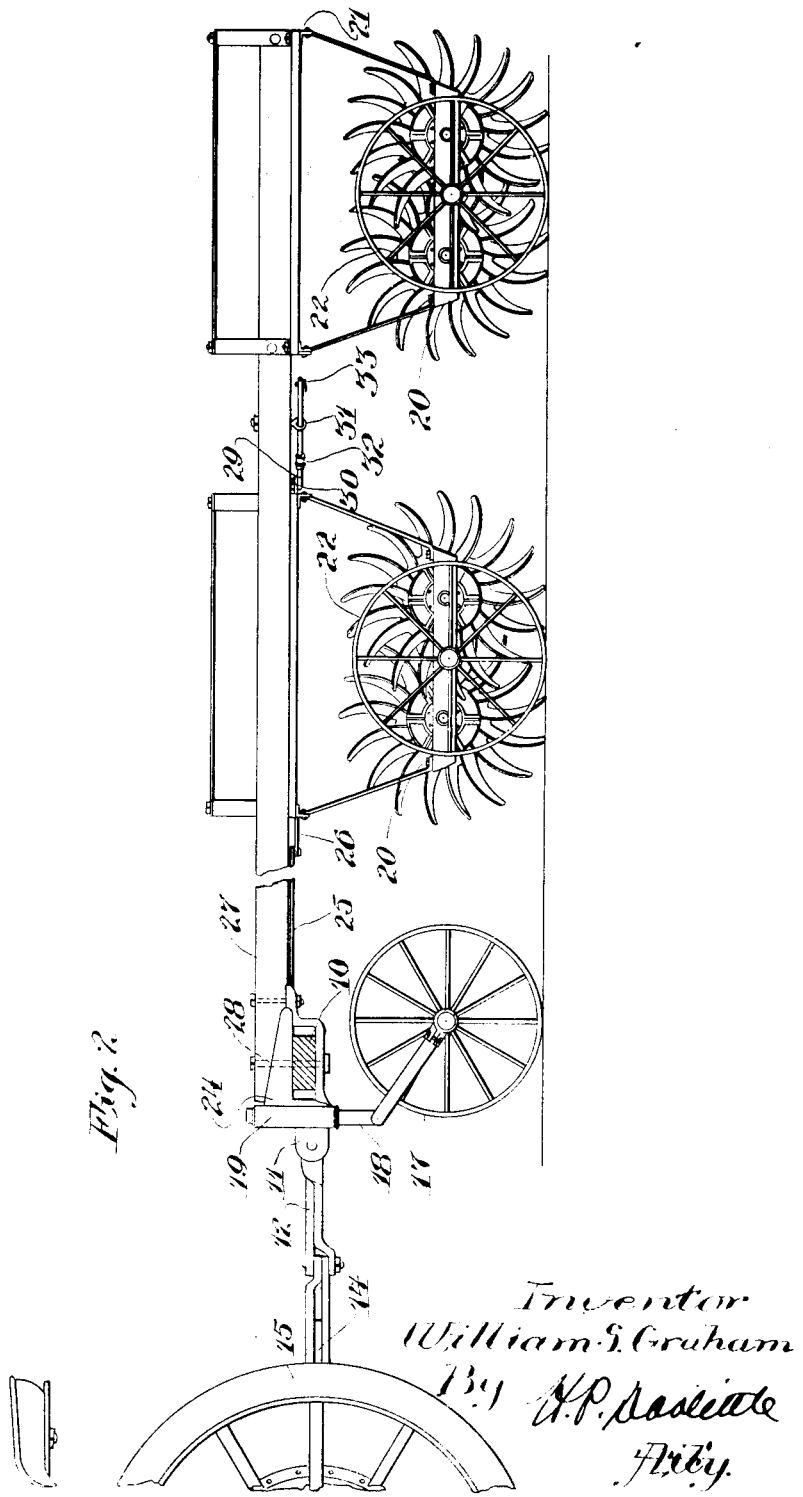

Referring to the drawings:

Figure 1 is a plan view showing the rear end or drawbar of a tractor with the assembly of implement units hitched thereto, the dotted lines indicating the range of horizontal swinging movement possible for one of the implements; and Figure 2 is a similar side view.

In the preferred embodiment of the invention to be disclosed there is provided a cross bar 10 having a central clevis 11 which is hinged for vertical movement to the end of a draft link 12, which is pivoted at 13 to the dragbar 14 of a tractor, the traction wheels of which are indicated at 15. Preferably the cross bar 10 is braced to the drawbar 12 by means of diagonal links 16. Caster wheels 17 are provided for supporting each end of the cross bar 10 and these wheels have vertical standards 18 journaled in bearing brackets 19 on each end of the cross bar. The cross bar 10, therefore, may be regarded as a draft frame or member which receives the pull of the tractor and which is free to swing laterally on the tractor with draft link 12 and may also pivot on the connection of clevis 11 with the link. In the present embodiment of the invention two implements are shown as connected to the drawbar 10. These are preferably arranged in rearwardly and laterally offset relation, as shown in Figure 1, and preferably consist of rotary tillage implements such as gangs of overlapping rotary hoes 20, shown in Figure 2. Each implement also comprises a transversely extended frame 21 which may be supported on transport or gauge wheels 22. The forward of the two implement frames is provided at its center with a short tongue 23 which is secured to one end of the cross bar 10 through a seat 24 forming an integral part of the bearing bracket 19. At its inner end this implement frame has a second connection to the cross bar 10 through a link 25 centrally connected to the cross bar and to a member 26 extending across the end of the implement frame and projecting beyond it at both front and rear. This implement frame is held in fixed parallel relation to the cross bar 10. The second or rearwardly and laterally disposed implement has a long tongue 27 connected at its central portion which is seated in a second socket 24 similar in all respects to that receiving the tongue 23 of the first mentioned implement. The bracket 19, of which this socket 24 is a part, is pivoted on a vertical axis to the end of the cross bar 10 by means of a pivot bolt 28 passing through the tongue, bracket and bar. The tongue 27 together with the bracket 19 is, therefore, free to swing laterally on bolt 28. This permits the rear offset implement unit to swing in an arc behind and overlapping the path of the front implement unit, as indicated in Figure 1. In order to restrict the range of swinging movement of the rearward implement unit and prevent it from coming into contact with the front unit when a short turn to the right is made or swinging too far outwardly when a turn to the left is made, there is provided a governing rod 29, the inner end of which is pivoted in an aperture 30 formed in the rear end of the bar 26, and the outer portion of which is slidably supported in an eye 31 projecting from the under surface of the tongue 27 at a point near the rear end of said tongue. On the inner portion of rod 29 there is provided an adjustable stop, such as a collar and set screw 32, and a suitable stop is also provided in the end of the bar, such as a cotter pin or a bolt 33. By suitably positioning the stop collar 32, it can be made to engage the eye 31 in a manner to limit the swing of the tongue and should at all times be so set as to prevent the inner end of the rear implement frame from coming into contact with the forward implement frame.

It will be observed that the construction above described is one that is characterized by the fact that the double implement hitch provided has forward draft means pivoted on the tractor drawbar with which one of the implement frames moves as a unit, and other draft means pivoted to the first draft means with which the second implement moves or swings through a restricted arc; also by the fact that a flexible arrangement is provided which permits short turns of the tractor to which the implements are attached, without side drag on the implements or risk of the implements fouling one another or not resuming their proper offset positions when forward travel is continued.

While the above construction exemplifies the preferred form of the invention, it may be subjected to certain modifications without departure from the scope of the invention defined in the following claims.

What is claimed is:

1. A multiple implement assembly comprising the combination of draft means pivoted to a tractor drawbar for lateral movement, an implement having a frame fixedly connected to said draft means, a second implement having draft means pivoted to said first draft means for lateral swinging movement, said second implement being in rearwardly and laterally offset relation to the first implement, and means for governing the swinging movement of said second implement on its pivot comprising a rod connecting the implements and having an adjustable sliding connection with one of them.

2. A double pulverizer unit assembly comprising the combination of a cross bar constituting a draft receiving means, ground engaging supports for said bar, a rotary implement having a laterally extended frame with a central tongue rigidly connected to one end of said cross bar, a second similar implement located in rearwardly and laterally offset relation to said first implement and having a central tongue pivoted to the other end of the cross bar for lateral swinging movement, and means for governing relative movement of said implements comprising a laterally projecting rod pivoted on one implement and slidably connected to the other and a stop on the rod for limiting the movement of said implement.

3. A multiple implement assembly comprising the combination of a crossbar adapted for connection to a tractor, adjacent implements having extended frames in parallel relation to the crossbar, draft members connecting one of said frames in fixed relation to the crossbar, a draft tongue pivoted at its forward end to the cross bar and connecting the adjacent frame to the crossbar for lateral swinging movement, and means carried by the fixed frame and slidably engaging the swingable frame for limiting its movement to a predetermined arc.

In testimony whereof I affix my signature.

WILLIAM S. GRAHAM.